United States Patent
Bandman et al.

(10) Patent No.: US 8,069,108 B2
(45) Date of Patent: Nov. 29, 2011

(54) SYSTEM AND METHOD FOR DISPLAYING AND/OR ANALYZING A LIMIT ORDER BOOK

(75) Inventors: Jeffrey M. Bandman, New York, NY (US); Nathan J. Ondyak, New York, NY (US); Eugene M. Sorenson, New York, NY (US); Bernie A. Weinstein, Katonah, NY (US)

(73) Assignee: CFPH, LLC, New York, NY (US)

( * ) Notice: Subject to any disclaimer, the term of this patent is extended or adjusted under 35 U.S.C. 154(b) by 468 days.

(21) Appl. No.: 12/395,603

(22) Filed: Feb. 27, 2009

(65) Prior Publication Data
US 2009/0171833 A1 Jul. 2, 2009

Related U.S. Application Data

(62) Division of application No. 11/189,329, filed on Jul. 26, 2005, now Pat. No. 7,933,828.

(51) Int. Cl.
*G06Q 40/00* (2006.01)
(52) U.S. Cl. ............... 705/37; 705/35; 705/36 R
(58) Field of Classification Search ............ 705/37, 705/35, 36 R
See application file for complete search history.

(56) References Cited

U.S. PATENT DOCUMENTS

| | | | |
|---|---|---|---|
| 5,297,031 A * | 3/1994 | Gutterman et al. | 705/37 |
| 5,414,838 A | 5/1995 | Kolton et al. | |
| 6,098,051 A | 8/2000 | Lupien et al. | |
| 6,493,681 B1 | 12/2002 | Tertitski et al. | |
| 6,766,304 B2 | 7/2004 | Kemp, II et al. | |
| 2002/0019799 A1* | 2/2002 | Ginsberg et al. | 705/37 |
| 2002/0073017 A1 | 6/2002 | Robertson | |
| 2003/0009411 A1 | 1/2003 | Ram et al. | |
| 2005/0075963 A1* | 4/2005 | Balabon | 705/36 |
| 2005/0075965 A1 | 4/2005 | Cutler | |
| 2005/0228735 A1* | 10/2005 | Duquette | 705/37 |
| 2005/0228743 A1 | 10/2005 | Warsaw et al. | |
| 2005/0261999 A1 | 11/2005 | Rowady, Jr. | |

(Continued)

FOREIGN PATENT DOCUMENTS

JP 2001-222591 8/2001

(Continued)

OTHER PUBLICATIONS

3DStockCharts.com Launches ECN Super Center; PR Newswire; New York; Oct. 8, 2002; 2-pages.*

(Continued)

*Primary Examiner* — Gregory Johnson
(74) *Attorney, Agent, or Firm* — Thomas D. Bradshaw

(57) ABSTRACT

According to one embodiment, a method of generating a display of a limit order book is provided. Data regarding a plurality of limit orders entered onto an electronic market is received and recorded, at least temporarily. The data regarding each limit order includes a price and a time associated with that limit order. Based on the received data, a graphical display is generated that indicates, for each recorded limit order entered into the electronic market within a period of time, the price and the time associated with that limit order. The price associated with each limit order is indicated by a first axis of the graphical display and the time associated with each limit order is indicated by a second axis of the graphical display. The graphical display may be displayed using an electronic display device.

49 Claims, 4 Drawing Sheets

U.S. PATENT DOCUMENTS

| | | | |
|---|---|---|---|
| 2006/0010066 A1 | 1/2006 | Rosenthal et al. | |
| 2006/0069635 A1* | 3/2006 | Ram et al. | 705/37 |
| 2006/0161495 A1 | 7/2006 | Wigzell | |
| 2006/0242040 A1 | 10/2006 | Rader | |
| 2006/0259394 A1* | 11/2006 | Cushing et al. | 705/37 |
| 2006/0265317 A1 | 11/2006 | Duquette | |
| 2007/0027788 A1 | 2/2007 | Bandman et al. | |
| 2007/0100718 A1 | 5/2007 | Gilbert et al. | |

FOREIGN PATENT DOCUMENTS

| | | |
|---|---|---|
| JP | 2004-70534 | 3/2004 |
| JP | 2004-537114 | 12/2004 |
| WO | WO/2003/010629 | 2/2003 |
| WO | WO/03/107121 | 12/2003 |

OTHER PUBLICATIONS

Making Sense of Technology; Marcus, Daniel; Traders Magazine, v15, n194; Mar. 2002; 3-pages.*

Market Makers vs. ECNs; Dorsey, Michael T; Traders Magazine, v13, n173; Oct. 2000; 2-pages.*

Nasdaq's New Crown Jewel Will SuperMontage end Fragmentation?; Peter Chapman; Traders Magazine; New York; Jun. 1, 2002; 4-pages.*

Calculating quantile-based risk analytics with L-estimators; Journal of Risk Finance; v 4, n 3, p. 61; Mar. 2003; 12-pages.*

Limiting losses; Investors Chronicle; Apr. 8, 2004; 4-pages.*

The probability of limit-order execution; Jin-Wan Cho; Edward Nelling; Financial Analysts Journal; Sep./Oct. 2000; 56, 5; 6-pages.*

USPTO Notice of Allowance and Fees Due and Examiner Interview Summary for U.S. Appl. No. 11/189,329, Dec. 21, 2010 (22 pages).

3DStockCharts.com Launches ECN Super Center, PR Newswire, New York, dated Oct. 8, 2002 (2 pages).

Daniel Marcus, Making Sense of Technology, Traders Magazine, v15, n194, Mar. 2002 (3 pages).

Michael T. Dorsey, Market Makers VS. ECNs, Traders Magazine, v13, n173, Oct. 2000 (2 pages).

Peter Chapman, Nasdaq's New Crown Jewel Will SuperMontage End Fragmentation?, Traders Magazine, New York, Jun. 1, 2002 (4 pages).

Japanese Office Action with English translation for Application No. 2008-524054, dated Nov. 9, 2010 (7 pages).

EPO Communication and extended European search report for Application No. EP 06788400.7, mailed Mar. 4, 2011 (5 pages).

Australian Examination Report for Application No. 2006275972, dated Mar. 22, 2011 (2 pages).

Australian Notice of Acceptance for Application No. 2006275972, dated Mar. 29, 2011 (3 pages).

PCT Notification of Transmittal of the International Search Report and the Written Opinion of the International Searching Authority for International Application No. PCT/US06/28806; dated Jul. 7, 2008 (6 pages).

International Preliminary Report on Patentability for International Application No. PCT/US06/28806; dated Mar. 17, 2009 (4 pages).

Australian Examination Report for Application No. 2006275972, dated Jul. 2, 2009 (3 pages).

USPTO Office Action for U.S. Appl. No. 11/189,329, May 12, 2008 (7 pages).

USPTO Examiner Interview Summary for U.S. Appl. No. 11/189,329, May 23, 2008 (2 pages).

USPTO Office Action for U.S. Appl. No. 11/189,329, Aug. 22, 2008 (12 pages).

U.S. Appl. No. 11/189,329, filed Jul. 26, 2005, Bandman et al.

USPTO Office Action for U.S. Appl. No. 11/189,329, Apr. 15, 2009 (22 pages).

USPTO Pre-Brief Appeal Conference Decision for U.S. Appl. No. 11/189,329, Oct. 16, 2009 (2 pages).

USPTO Office Action for U.S. Appl. No. 11/189,329, Dec. 23, 2009 (20 pages).

Japanese Office Action with English translation for Application No. 2008-524054, mailed Apr. 12, 2011 (4 pages).

* cited by examiner

| MARKET DISTANCE | WEIGHTING | | | | |
| --- | --- | --- | --- | --- | --- |
| | EXAMPLE 1 | EXAMPLE 2 | EXAMPLE 3 | EXAMPLE 4 | EXAMPLE 5 |
| 1 | 50.00% | 44.50% | 24.25% | 18.00% | 30.00% |
| 2 | 25.00% | 24.70% | 19.75% | 16.20% | 23.00% |
| 3 | 12.50% | 13.70% | 15.75% | 14.40% | 17.00% |
| 4 | 6.30% | 7.60% | 12.23% | 12.70% | 12.00% |
| 5 | 3.10% | 4.20% | 9.25% | 10.90% | 8.00% |
| 6 | 1.60% | 2.40% | 6.75% | 9.10% | 5.00% |
| 7 | 0.80% | 1.30% | 4.75% | 7.30% | 3.00% |
| 8 | 0.40% | 0.70% | 3.25% | 5.60% | 2.00% |
| 9 | 0.20% | 0.40% | 2.25% | 3.80% | 1.00% |
| 10 | 0.10% | 0.20% | 1.75% | 2.00% | 0.50% |

252  254  256  258  260  262

SYSTEM AND METHOD FOR DISPLAYING AND/OR ANALYZING A LIMIT ORDER BOOK

RELATED APPLICATIONS

This application is a divisional application of U.S. application Ser. No. 11/189,329 filed Jul. 26, 2005 now U.S. Pat. No. 7,933,828, the disclosure of which is incorporated herein by reference in its entirety.

TECHNICAL FIELD OF THE INVENTION

This invention relates in general to trading markets and, more particularly, to a system and method for displaying and/or analyzing a limit order book.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments.

Many of these electronic trading systems use a bid/offer process in which bids and offers are submitted to the systems by a passive side. These bids and offers are hit and lifted (or taken) by an aggressive side. For example, a passive trader may submit a "bid" to buy a particular number of 30 year U.S. Treasury Bonds at a given price. In response to such a bid, an aggressive trader may submit a "hit" in order to indicate a willingness to sell bonds to the first trader at the given price. Alternatively, a passive side trader may submit an "offer" to sell a particular number of the bonds at the given price, and then the aggressive side trader may submit a "lift" (or "take") in response to the offer to indicate a willingness to buy bonds from the passive side trader at the given price. In such trading systems, the bid, the offer, the hit, and the lift (or take) may be collectively known as "orders." Thus, when a trader submits a bit, the trader is said to be submitting an order.

SUMMARY OF THE INVENTION

In accordance with the present invention, systems and methods for displaying and/or analyzing a limit order book are provided.

According to one embodiment, a method of generating a display of a limit order book is provided. Data regarding a plurality of limit orders entered onto an electronic market is received and recorded, at least temporarily. The data regarding each limit order includes a price and a time associated with that limit order. Based on the received data, a graphical display is generated that indicates, for each recorded limit order entered into the electronic market within a period of time, the price and the time associated with that limit order. The price associated with each limit order is indicated by a first axis of the graphical display and the time associated with each limit order is indicated by a second axis of the graphical display. The graphical display may be displayed using an electronic display device.

According to another embodiment, a method of analyzing an electronic limit order book is provided. Data regarding a plurality of limit orders entered onto an electronic market is received and recorded, at least temporarily. The data regarding each limit order includes a price and a time associated with that limit order. One or more market indicators regarding the state of the electronic market may be periodically calculated. Each of the periodic calculations may include identifying a subset of limit orders for that periodic calculation; determining a market distance for each of the subset of limit orders, the market distance for each limit order comprising the difference between the price of that limit order and a market price; weighting each of the subset of limit orders based at least on the determined market distance for that limit order; and calculating the one or more market indicators based at least on the weighting of each of the subset of limit orders. The one or more periodically calculated market indicators may be displayed in a graphical user interface.

Various embodiments of the present invention may benefit from numerous advantages. It should be noted that one or more embodiments may benefit from some, none, or all of the advantages discussed below.

One advantage of certain embodiments of the invention is that systems and methods may be is provided for displaying a limit order book of an electronic trading exchange in a manner that may be used by traders to make trading decisions. For example, the system may record and graphically display each bid and offer (and/or other limit orders) entered onto an electronic trading exchange for a particular product over a particular period of time. In some embodiments, the graphical display may be updated substantially in real time. The graphical display may allow a trader or other user to visualize various characteristics of the market environment, such as the number, size and/or density of bids and/or offers are various prices over time. Thus, the trader may be able to recognize trends in the market, such as buying pressure or selling pressure, for example, and making trading decisions accordingly.

In some embodiments, the graphical display may indicate outstanding unsatisfied supply and demand and/or how aggressive traders are or were in submitting orders. This information may indicate support and/or resistance levels in the market, which information the trader can use to evaluate the probability of a market trend in price and/or consolidation.

Another advantage of certain embodiments of the invention is that a system may be provided for analyzing a limit order book of an electronic trading exchange for a particular product to use various algorithms to periodically calculate one or more market indicators regarding the state of the limit order book. Such analysis may include weighting each limit order based on the distance of that order's price from a market price, such as the price of the best bid or offer on the market or the price of a recent trade, for example. In some embodiments, the system may periodically calculate a net market score that may provide a quick summary (e.g., a single number) expressing the extent of buying pressure or selling pressure currently in the market, for example. The net market score may be displayed to the trader, either in connection with or separate from the display of the limit order book discussed above, and may be updated periodically. The net market score and/or other types of market indicators calculated by the system may be used by a trader for making trading decisions.

In some embodiments, a trader may use the system described herein to identify whether/when an imbalance exists between supply and demand at the current price level. This may be shown via a graphical display and may also be measured using various algorithms to periodically calculate one, or more market indicators. The graphical display may indicate the existence of a sparsity of orders in the market, which may indicate a lack of support/buyers (or resistance/sellers). A trader viewing the graphical display and/or market indicators may be able to anticipate market turning points as he or she sees the emergence of bids/offers at one or more given price levels. Multiple orders entered onto the market at a given price level may be displayed as increasing density on the graphical display, as many points on the chart may be clustered together.

In addition, the graphical display may indicate the aggressiveness of each side of the market based on how close orders are placed to the "market price," or the price at which trades were most recently executed. Weighting algorithms may be used to quantify this information in the form of various market indicators. In addition, the graphical display may indicate when market participants become more or less aggressive as shown by increasing/decreasing density of orders at a given price level.

Also, because the graphical display may show outstanding bids and offers not at the best, or market, price, the display may indicate the existence of latent demand or supply in the market. Such latent demand may be likely to serve as a supporting bid that will continue to rest below the market or may drive the market higher as buyers chase the market upward. Similarly, latent supply may be likely to serve as resistance that will continue to rest above the market or may drive the market lower as seller chase the market downward.

Thus, the current systems and methods may provide a trader information for understanding the strength of supply and demand in a market, as evidenced by the density of limit bids and offers. Such information may indicate whether a market is more or less likely to trend or consolidate, which may providing critical information on which a trader may base his or her trading decisions.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
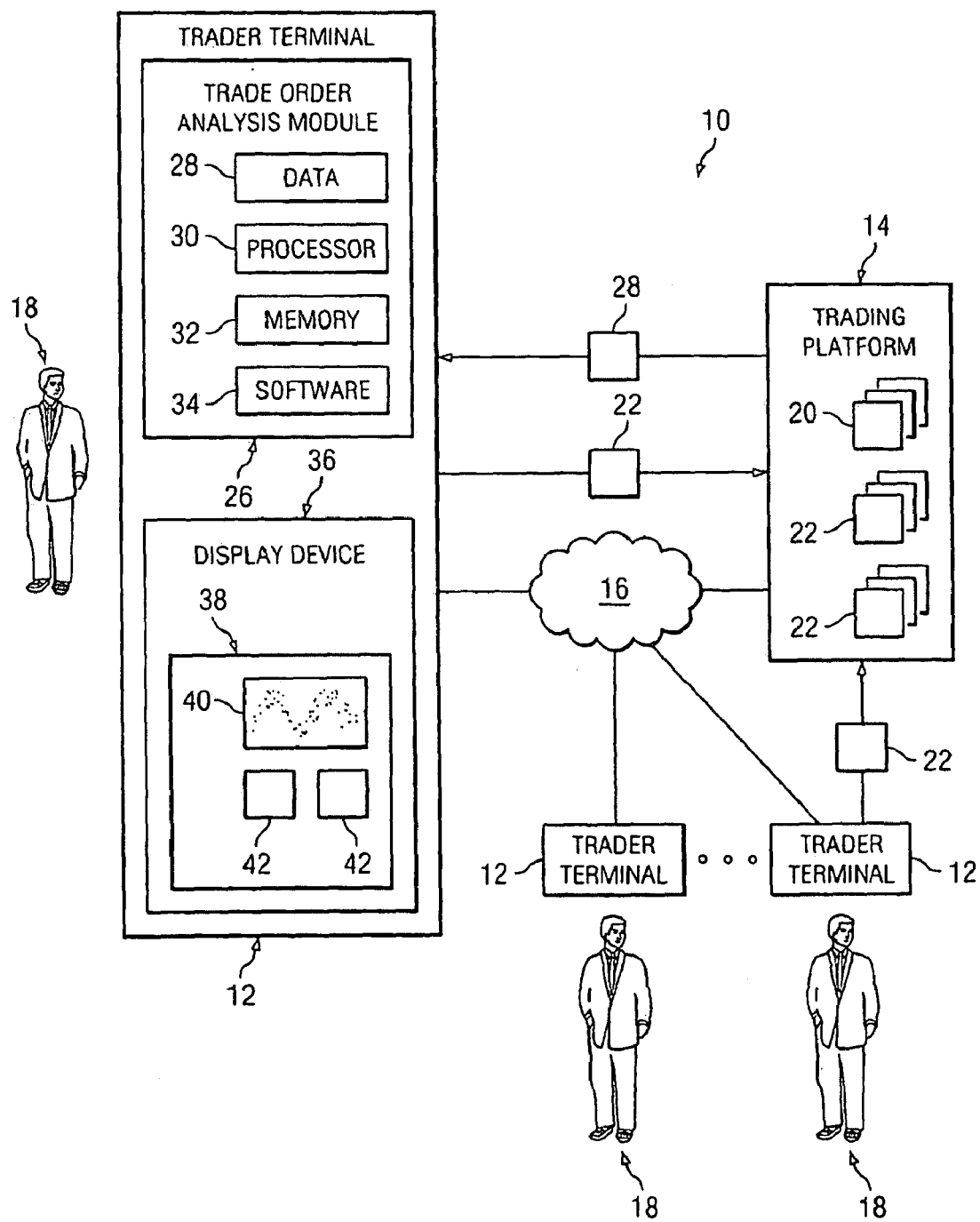
FIG. 1 illustrates an example trading system according to an embodiment of the present invention.

Example embodiments of the present invention and their advantages are best understood by referring now to FIGS. 1 through 6 of the drawings, in which like numerals refer to like parts.

In general, a system is provided for analyzing and displaying a limit order book of an electronic trading exchange in a manner that may be used by traders to make trading decisions. In certain embodiments, the system may record and graphically display each bid and offer (and/or other limit orders) entered onto the electronic trading exchange at various prices over a particular period of time, such as a period of time from the present extending back a particular amount of time. The graphical display may be updated periodically, and in some embodiments, substantially in real time. In certain embodiments, the graphical display includes a plot indicating the price of the limit orders along a first axis (e.g. vertical axis) and the time that the limit orders were entered onto the market along a second axis (e.g. horizontal axis). The plot may be illustrated as a "moving window" display that shifts along the horizontal axis over time. Thus, a trader viewing the graphical display of the limit order book may visualize various characteristics of the market, such as the number, size and/or density of bids and/or offers are various prices over time. Thus, the trader may be able to recognize trends in the market, such as buying pressure or selling pressure, for example.

In addition, in certain embodiments, the system may analyze the limit order book of the electronic trading exchange at a particular instant or over a period of time to periodically calculate one or more market indicators regarding the state of the limit order book. For example, the system may apply various algorithms to the set of limit orders currently on the trading exchange that has a price within a particular distance from a market price (such as the price of the best bid, best offer, or a recent trade, for example). In certain embodiments, the system may weight each order in the set of limit orders based at least on the distance of that order's price from the market price, calculate a total bid score for the group of bid orders on the market and a total offer score for the group of offer orders on the market, and subtract the total offer score from the total bid score (or vice versa) to determine a net market score. The net market score may provide a quick summary (e.g., a single number) of the state of the market, such as the extent of buying pressure or selling pressure currently in the market, for example. The net market score may be displayed to the trader, either in connection with or separate from the display of the limit order book discussed above, and may be updated periodically. In some embodiments, the system may also calculate and display a net market score moving average based on a predetermined number of calculated net market scores going back in time from the present.

In certain embodiments, various system parameters may be selected or otherwise controlled by a user, such as the trader or an administrator, in one example. For example, the user may select various parameters regarding the manner in which individual or groups of limit orders are graphically displayed. As another example, the set of weights applied to limit orders at various distances from the market price may be selected by the user as desired. As another example, parameters for determining which limit orders are included in the analysis of the limit order book may be selected by the user as desired. As yet another example, the user may select the frequency that the one or more market indicators are calculated. As yet another example, the user may select the number of calculated net market scores to be included in a net market score moving average displayed to the user.

FIG. 1 illustrates an example trading system 10 according to an embodiment of the present invention. As shown, system 10 may include one or more trader terminals 12 coupled to a trading platform 14 by a communications network 16. A trader 18 may include any entity, such as an individual, group of individuals or firm, that engages in trading activity via trading platform 14. For example, a trader 18 may be an individual investor, a group of investors, a firm (e.g., a brokerage or bank), an institutional investor, a hedger, a speculator, or a market maker (i.e., an individual or firm that submits and/or maintains both bid and ask orders simultaneously for the same instrument).

Traders 18 may place various trading orders 20 via trading platform 14 to trade financial instruments, such as stocks or other equity securities, bonds, mutual funds, options, futures, derivatives, and currencies, for example. In some embodiments, trading orders 20 may include limit orders 22 and/or one or more other types of orders 20, such as market orders, limit orders, stop loss orders, day orders, open orders, GTC ("good till cancelled") orders, "good through" orders, an "all or none" orders, or "any part" orders, for example and not by way of limitation. Generally, limit orders 22 may include bids and offers. In some embodiments, limit orders 22 may also include one or more other types of orders. For example, in certain embodiments, limit orders 22 may include any one or more of the following types of orders:

(a) bid—passive commitment to purchase a particular product at a particular price, the bid price;

(b) offer—passive commitment to sell a particular product at a particular price, the offer price;

(c) buy order—aggressive order that lifts (or takes) a pending offer, thus initiating a trade; and (d) sell order—aggressive order that hits a pending bid, thus initiating a trade.

Trader terminals 12 may provide traders 18 access to engage in trading activity via trading platform 14. For example, a trader terminal 12 may include a computer system and appropriate software to allow a trader 18 to engage in trading activity via trading platform 14. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

A trader terminal 12 may include a trading order analysis module 26 generally operable to analyze data and provide feedback (e.g., via a graphical user interface) regarding trading orders 20 placed on an electronic trading market managed by trading platform 14. In the embodiments discussed herein, trading order analysis module 26 is generally operable to provide various functionality regarding the analysis and/or other management of data regarding limit orders 22 submitted to such an electronic trading market. For example, as discussed in greater detail below, trading order analysis module 26 may be operable to receive data 28 regarding limit orders placed on an electronic trading market, record such data 28 (at least temporarily), use such data 28 to generate graphical displays representing the limit order book for the electronic trading market (such as a plot of limit orders 22 price versus time, for example), analyze such data 28 to determine one or more market indicators regarding the limit order book for the electronic trading market, display such market indicators to a trader 18, and/or allow the trader 18 to control various parameters regarding the analysis and display of such data 28.

It should be understood that in other embodiments, trading order analysis module 26 may additionally or alternatively provide similar functionality regarding other types of trading orders 20. In addition, it should be understood that in certain embodiments, any or all of the functionality described herein as being provided by trading order analysis module 26 at trading terminal 12 may alternatively or additionally be performed or provided by any other portion of trading system 10, such as trading platform 14, communications network 16, or one or more servers associated with one or more trading terminals 12, such as servers associated with a trading firm (e.g., a brokerage or bank) or other collection of traders 18, for example. Thus, any relevant portion(s) of trading system 10 may include any suitable hardware and/or software appropriate for performing or providing any or all of such functionality.

Trading order analysis module 26 may include a processor 30, memory 32, and/or order analysis software 34 stored in memory 32. Processing unit 32 may execute software 32 to provide any or all of the various functions provided by trading order analysis module 26. Memory 32 may also store, at least temporarily, limit order data 28, which may be received from trading platform 14, as discussed below. Memory 32 may be coupled to processor 30 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Trader terminal 12 may also include a display device 36, such as a monitor, screen, panel display, or any other suitable device operable to display information to a trader 18. In certain embodiments, display device 36 may be operable to display a graphical user interface 38, which may be used to display various information regarding trading system 10, such as output from trading order analysis module 26 regarding limit order data 28, for example, as discussed herein. Graphical user interface 38 may include any suitable software or other executable code for displaying such information via display device 36. A trader terminal 12 may also include one or more human interfaces, such as a mouse, keyboard, or pointer, for example, allowing a trader 18 to input data for participating in trading activity associated with trading platform 14 and/or for selecting or otherwise controlling various parameters regarding the analysis and display of such data 28.

Communications network 16 is a communicative platform operable to exchange data or information between trading platform 14 and both and traders 18. Communications network 16 represents an Internet architecture in a particular embodiment of the present invention, which provides traders 18 with the ability to electronically execute trades or initiate transactions to be delivered to an authorized exchange trading floor. Alternatively, communications network 16 could be a plain old telephone system (POTS), which traders 18 could use to perform the same operations or functions. Such transactions may be assisted by a broker associated with trading platform 14 or manually keyed into a telephone or other suitable electronic equipment in order to request that a transaction be executed. In other embodiments, communications system 14 could be any packet data network (PDN) offering a communications interface or exchange between any two nodes in system 10. Communications network 16 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Trading platform 14 may comprise a trading architecture that facilitates the management of one or more electronic trading exchanges for one or more tradable instruments or products. In particular, trading platform 14 may manage or facilitate the trading of trading orders 20, such as limit orders 22 and/or one or more other types of orders 20. Trading platform 14 may be operable to receive limit orders 22 from traders 18 and manage or process such limit orders 22 such that financial transactions among and between traders 18 may be performed. Trading platform 14 may have a link or a connection to a market trading floor, or some other suitable coupling to any suitable element that allows for such transactions to be consummated.

Trading platform 14 may include a computer, a server, a management center, a single workstation, or a headquartering office for any person, business, or entity that seeks to manage the trading of trading orders 20. Accordingly, trading platform 14 may include any suitable hardware, software, personnel, devices, components, elements, or objects that may be utilized or implemented for managing or administering one or more electronic trading exchanges. It should be understood that the functionality provided by trading platform 14 may be at least partially manual such that one or more humans may provide various functionality associated with trading platform 14.

As discussed above, trading order analysis module 26 may provide various functionality regarding the analysis and/or management of limit order data 28, which may be received from trading platform 14, for example. For example, trading order analysis module 26 may receive limit order data 28 from trading platform 14 regarding limit orders 22 placed on an electronic trading market managed by trading platform 14. Limit order data 28 may include any data regarding limit orders 22 placed on the electronic trading market, such as the type of the limit order 22 (e.g., bid, offer, hit, or take, for example), the price of the limit order 22 (e.g., bid price or offer price), the size of the limit order 22, the time the limit order 22 was received by trading platform 14 or entered onto the relevant electronic trading market, the trader 18 that placed the limit order 22, the account associated with the limit order 22, and/or an expiration time for the limit order 22, for example. Limit order data 28 for a limit order 22 may also include information regarding the status of the limit order 22, such as whether the limit order 22 has been removed from the market, whether the limit order 22 has entered into a trade state (i.e., is being executed with another trading order 20), the beginning and ending time of such a trade state, and/or the details of an executed trade, for example. In certain embodiments, trading platform 14 may communicate such limit order data 28 to trading order analysis module 26 via communications network 16 substantially in real time or otherwise.

Trading order analysis module 26 may then record such data 28 received from trading platform 14, at least temporarily, in memory 32 or otherwise, such that data 28 may be used for analyzing the limit order book for the particular product. Trading order analysis module 26 may use such received and/or recorded data 28 to generate a periodically updated graphical display representing the limit order book for the particular product, which may be displayed to a trader 18 via graphical user interface 38. For example, trading order analysis module 26 may generate a graphical plot 40 indicating (e.g., using various icons) the price and time of each limit order 22 entered onto the trading exchange for a particular period of time from the present extending back some amount of time. Trading order analysis module 26 may continuously or periodically update the plot 40, which may include adding to the plot representations (e.g., icons) of new limit orders 22 entered onto the exchange, removing from the plot representations (e.g., icons) of limit orders 22 removed from the exchange, or otherwise adding, removing, modifying and/or otherwise updating limit order data 28 to reflect trading activity associated with trading orders 20. An example of such plot 40, and an example method of generating such plot 40, are shown and discussed below with reference to FIGS. 2 and 3.

In certain embodiments, trading order analysis module 26 may analyze at least a portion of the limit order data 28 received from trading platform 14 to calculate one or more market indicators 42 regarding the limit order book for the trading exchange for the particular product. Trading order analysis module 26 may analyze all or a subset of the limit orders 22 currently on the trading exchange to calculate such market indicators 42. Trading order analysis module 26 facilitate or cause the display of such calculated market indicators 42 to a trader 18, such as via graphical user interface 38. In certain embodiments in which trading order analysis module 26 generates one or more plots 40 and calculates one or more market indicators 42, graphical user interface 38 may display the one or more plots 40 concurrently with, or separate from, the one or more market indicators 42. Example methods of calculating such market indicators 42 are discussed below with reference to FIG. 4.

In certain embodiments, trading order analysis module 26 may provide an interface allowing a trader 18 to control various parameters regarding the analysis and display of limit order data 28. For example, trading order analysis module 26 may allow trader 18 to select one or more of the following:

(a) one or more parameters regarding the manner in which individual or groups of limit orders are graphically displayed in a plot 40;

(b) the length of the "moving window" time period to be displayed by plot 40;

(c) the set of weights applied to limit orders 22 for calculating market indicators 42;

(d) one or more parameters for determining which limit orders 22 are displayed in a plot 40 and/or are included in the calculation of one or more market indicators 42;

(e) the frequency that the one or more market indicators 42 are calculated and/or displayed; and/or (f) the number of calculated net market scores to be included in various moving averages calculated and/or displayed to the user, such as a total bid score moving average, a total offer score moving average, and/or a net market score moving average (for example, see Equations (9)-(13) below).

It should be understood that such parameters are provided as examples only and not by way of limitation.

Displaying a Limit Order Book

As discussed above, trading order analysis module 26 may generate one or more graphical plots 40 indicating (e.g., using various icons) the status of the limit order book for a particular product based on limit order data 28 received from trading platform 14.

Figure 2:
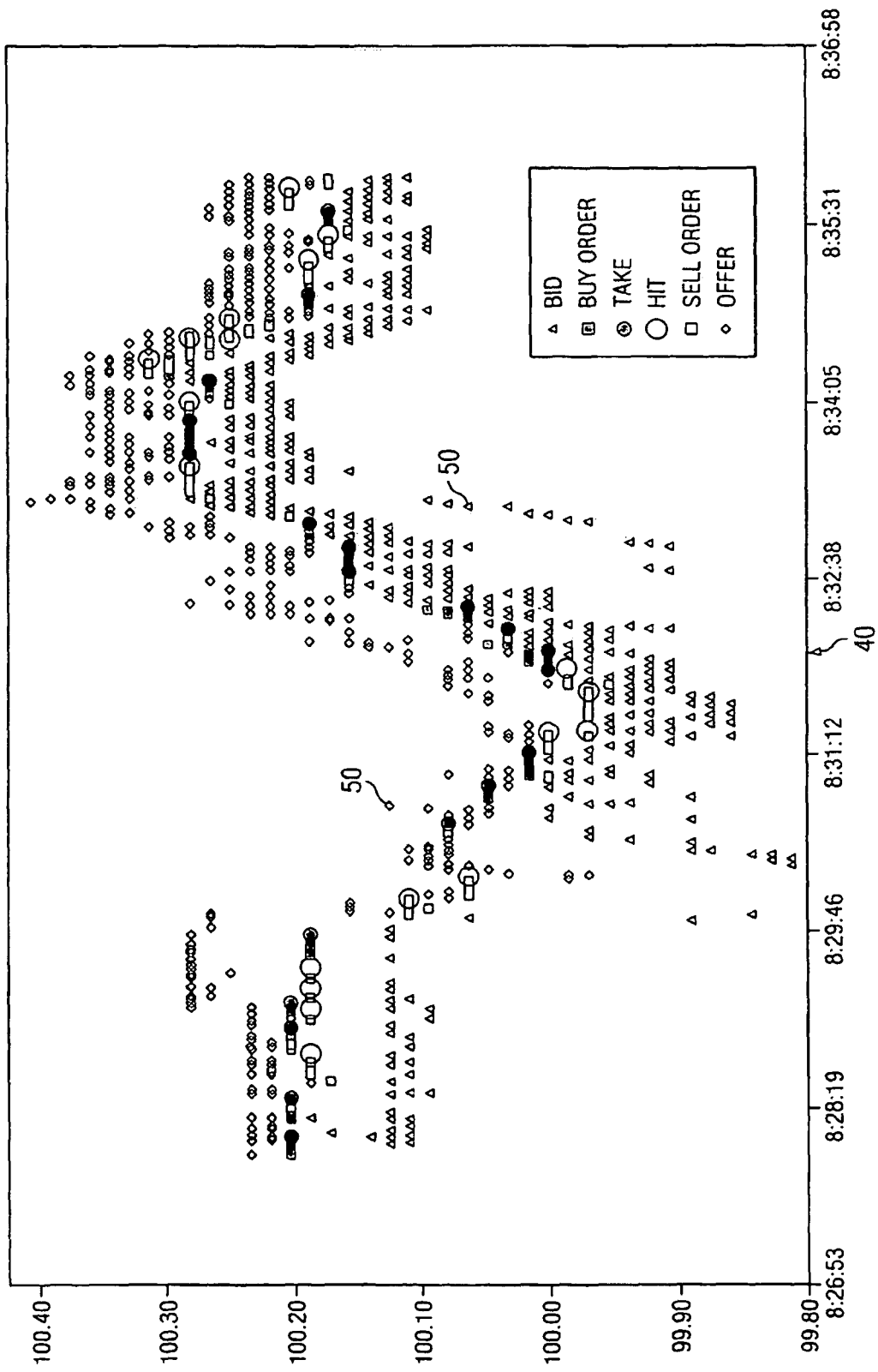
FIG. 2 illustrates an example graphical plot displaying the limit order book for the trading exchange for a particular product, according to one embodiment of the invention.

FIG. 2 illustrates an example plot 40 displaying the limit order book for the trading exchange for a particular product, according to one embodiment of the invention. Plot 40 indicates all or a subset of limit orders 22 associated with the trading exchange over a particular time period, such as, for example, (a) all or a subset of limit orders 22 entered onto the exchange during the particular time period, (b) all or a subset of limit orders 22 entered onto the exchange during the particular time period and currently remaining on the exchange, or (c) all or a subset of limit orders 22 entered onto the exchange during the particular time period and either currently remaining on the exchange or traded during the particular time period. In some embodiments, limit orders 22 removed from the exchange, for particular reasons or for any reason, may be removed from the plot 40.

As shown in FIG. 2, plot 40 may indicate the price and time of limit orders 22 using a plot 40 indicating the price of limit orders 22 along a first (in this embodiment, the y-axis) axis and the time of limit orders 22 along a second axis (in this embodiment, the x-axis). The "time" of a limit order 22 may refer to any time defined by limit order data 18 regarding the limit order 22, such as the time that the limit order 22 was received by trading platform 14 from the relevant trader 18 or the time that the limit order 22 was entered onto the relevant exchange by trading platform 14, for example.

Each limit order 22, or a group of limit orders 22 at the same price and time (i.e., limit orders 22 having the same location on plot 40), may be represented by one or more icons 50. Icons 50 may include any type of visual representation, which may be defined by any one or more visual parameters, such as shape, size, color, brightness, transparency, opaqueness, and/or flashing, for example. In addition, in alternative embodiments, icons 50 may indicate one or more parameters in a third dimension. For example, plot 40 may be a three-dimensional plot in which a third dimension is used to indicate one or more parameters such as the volume of limit orders 22, the number of limit orders 22, and/or the number of different traders 18 having placed one or more limit orders 22 at a particular time and price. Thus, in such embodiments, icons 50 may have a length (or height) in the third dimension indicating the magnitude of such parameters regarding the relevant limit order(s) 22.

As mentioned above, plot 40 shown in FIG. 2 may be a "moving window" display in which the displayed data (e.g. icons 50), shift along the time axis (in this embodiment, horizontally). Thus, in this embodiment, an icon 50 representing a newly placed limit order enters onto plot 40 on right side, shifts across plot 40 from right to left, and exit from the left side plot 40. The duration of time displayed in such a "moving window" plot 40 may be selected and/or modified by a trader 18 as desired. Thus, the trader 18 may generally control the amount of data they wish to be displayed at any given time.

In certain embodiments, different types of limit orders 22 may be represented by different types of icons 50. Different types of icons 50 may refer to icons 50 having at least one different visual parameter, such as those listed above, for example. For example, bids and offers have be represented by different types of icons 50. In certain embodiments including bids, offers, buy orders and sell orders, different types of icons 50 are used for bids, offers, buy orders and sell orders. In the particular example shown in FIG. 2, bids are represented by yellow triangles, offers are represented by blue diamonds, buy orders are represented by orange rectangles, and sell orders are represented by green rectangles. The duration of each trade process or execution (e.g., work-up process) initiated by each buy order is indicated by the length (along the x-axis) of the orange rectangle corresponding to that buy order. Similarly, the duration of each trade process or execution (e.g., work-up process) initiated by each sell order is indicated by the length (along the x-axis) of the green rectangle corresponding to that sell order. In addition, in the particular example shown in FIG. 2, the completion of a trade initiated by a buy order (which may be referred to as a "lift" or "take") may be indicated by another icon 50, here, a small brown circle. Similarly, the completion of a trade initiated by a sell order (which may be referred to as a "hit") may be indicated by another icon 50, here, a large red circle. It should be understood that in other embodiments, any one or more types of icons 50 may be used to represent various types of limit orders 22 and/or transactions or trading events regarding such limit orders 22.

As another example, limit orders 22 placed by different types of traders 18 and/or associated with different types of trading accounts may be represented by different types of icons 50. For example, different types of traders 18 may include one or more of the following: an individual investor, a group of investors, a firm (e.g., a brokerage or bank), an institutional investor, a hedger, a speculator, a market maker, and a non-market maker. Any number of different types of icons 50 may be used to distinguish limit orders 22 placed by any of such different types of traders 18.

As another example, the relative size of each limit orders 22 may be indicated by one or more visual parameters of the relevant icon 50 used for that limit order 22. For example, the relative size of each limit orders 22 may be represented by the shape, size, color, brightness, transparency, opaqueness, flashing and/or three-dimensional magnitude of the relevant icon 50.

As another example, the market distance of each limit order 22 may be indicated by one or more visual parameters of the relevant icon 50 used for that limit order 22. For example, the market distance of each limit order 22 may be represented by the shape, size, color, brightness, transparency, opaqueness, and/or flashing of the relevant icon 50. As used herein, the "market distance" of a limit order 22 is defined as the difference between the price of the limit order 22 and a market price. The market price may be any price generally representing the current market for the relevant product, such as, or at least based on, (a) the price of the best bid or the best offer on the exchange or (b) the price of one or more recently executed trades, for example. For example, as the market distance of limit orders 22 decreases, the size, brightness, or opaqueness of the corresponding icons 50 may decrease, or the transparency of the corresponding icons 50 may increase.

In certain embodiments, only limit orders 22 within a particular market distance at the time of each limit order 22 are displayed on plot 40. For example, in one embodiment, only limit orders 22 within a particular number of price increments (e.g., ticks) from a current market price are displayed on plot 40. Thus, in such embodiments, significant outliers may be excluded from plot 40.

Multiple limit orders 22 at the same price and time (i.e., at the same location on plot 40) may be represented in any suitable manner to indicate the total size and/or the number of such multiple limit orders 22. In certain embodiments, a single icon 50 is used to represent the multiple limit orders 22, and one or more visual parameters of the icon 50 are varied to indicate the total size and/or the number of such multiple limit orders 22. For example, the total size of multiple limit orders 22 at a particular price and time (i.e., at a particular location on plot 40) may be indicated by the size, color, brightness, transparency, opaqueness and/or three-dimensional magnitude of the icon 50. Similarly, the number of the multiple limit orders 22 at the particular price and time (i.e., at a particular location on plot 40) may be indicated by such parameters of icon 50. In a particular embodiment, icons 50 representing individual limit orders 22 are at least partially transparent and displayed on top of each other such that each additional limit order 22 at the same price decreases the transparency (or increases the color, brightness, opaqueness or three-dimensional magnitude) of the icon 50 representing the multiple limit orders 22.

A graphical display of the limit order book for a particular product, such as plot 40 shown in FIG. 2, may provide a trader 18 various information regarding the current or recent limit order book. For example, plot 40 or similar graphical displays may give a trader 18 an indication or characterization of the overall volume of limit orders 22, the number of traders 18 and/or the density of limit orders 22 at various prices on each side of the market. Thus, plot 40 or similar graphical displays may give a trader 18 a holistic view or characterization of the limit order book for the product. Such visual information or characterizations may allow a trader 18 to relatively quickly and accurately determine or get a sense of the pressure on each side of the market for the product (i.e., the buying pressure and/or selling pressure on the product). The trader 18 may be able to use such information to make trading activity decisions, such as whether to buy or sell the product or wait, for example. For example, if the trader 18 identifies a relatively high density of bids entering the market at or near the current market price, the trader 18 may predict that the market price is likely to rise (or at least not fall) in the near future, and the trader 18 may act accordingly. Similarly, if the trader 18 identifies a relatively high density of offers entering the market at or near the current market price, the trader 18 may predict that the market price is likely to fall (or at least not rise) in the near future, and the trader 18 may act accordingly.

Trading order analysis module 26 and/or graphical user interface 38 may update plot 40 at any suitable frequency and/or in response to particular events. For example, plot 40 may be updated periodically at regular intervals, such as every 0.1 second, every 0.5 second, every second or every three seconds, for example. As another example, plot 40 may be updated each time new limit order data 28 is received, or each time a particular number of data items 28 are received. In some situations, the frequency of updating plot 40 may be limited by the processing speed of the relevant computer hardware and/or software systems.

As discussed above, in certain embodiments, trading order analysis module 26 may provide an interface allowing a trader 18 to control various parameters regarding the display of limit order data 28. For example, trading order analysis module 26 may provide an interface allowing a trader 18 to control (a) which icons 50 are used for particular types of limit orders 22, (b) any one or more of the visual parameters for such icons 50 discussed above, (c) the manner in which multiple limit orders 22 at the same price and time are displayed, (d) which limit orders 22 are displayed in plot 40 (e.g., the maximum market distance for displayed limit orders 22), (e) the range of prices and/or the size of price increments displayed along the y-axis of plot 40, (f) the period of time and/or the size of time increments displayed along the x-axis of plot 40, and/or (g) the frequency at which plot 40 is updated, for example.

Figure 3:
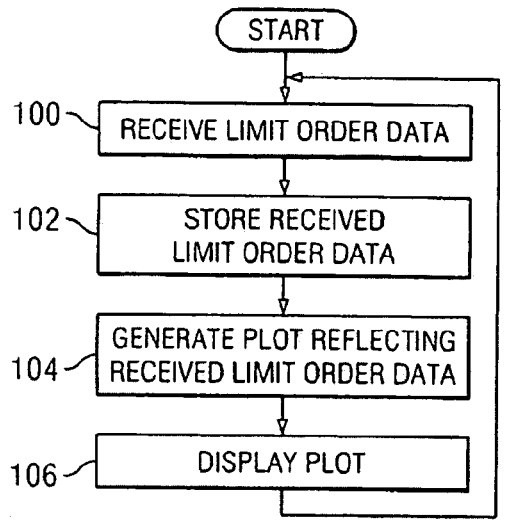
FIG. 3 illustrates an example method of generating and displaying a graphical display of a limit order book for a particular product, according to one embodiment of the present invention.

FIG. 3 illustrates an example method of generating and displaying a graphical display of a limit order book for a particular product, according to one embodiment of the present invention. In particular, an example method of generating plot 40 shown in FIG. 2 or a similar plot is discussed below. In this particular example, plot 40 is periodically updated at regular time intervals.

At step 100, trading order analysis module 26 receives limit order data 28 for a particular product from trading platform 14 during a particular time interval. Such data 28 may be received via communications network 16. Such data 28 may include data regarding one or more new limit orders 22, transactions regarding existing limit orders 22, or other data regarding existing limit orders 22 or other trading orders 20. At step 102, trading order analysis module 26 stores at least a portion of the received limit order data 28 in memory 32.

At step 104, trading order analysis module 26 may generate an updated plot 40 reflecting the limit order data 28 received during the particular time interval, which may include adding icons 50 representing one or more new limit orders 22, adding or modifying icons 50 representing one or more transactions regarding existing limit orders 22, removing one or more icons 50 representing limit orders 22 that have been removed, or otherwise adding, removing or modifying one or more icons 50 representing new or existing limit orders 22. At step 106, graphical user interface 38 may display the updated plot 40 on an electronic display device 36. The method may then return to repeat steps 100-106 for the next time interval. In this manner, the displayed plot 40 may be periodically (e.g., substantially continuously or otherwise) updated to reflect newly received limit order data 28 regarding trading activity for the particular product. A trader 18 may utilize the displayed plot 40 for making various trading determinations, such as described above regarding FIG. 2.

Analyzing a Limit Order Book

As discussed above, trading order analysis module 26 may analyze at least a portion of a limit order book to calculate one or more market indicators 42 regarding the limit order book that may be used by a trader 18 for making various trading determinations. In general, such analysis may include analyzing at least a portion of the limit orders 22 currently on the exchange but not at the current best, or market, price. Limit orders 22 included in the analysis may be weighted based at least on the market distance of such limit orders 22, wherein limit orders 22 having prices close to a market price (i.e., small market distances) are weighted greater than limit orders 22 having prices further from the market price (i.e., greater market distances).

Figure 4:
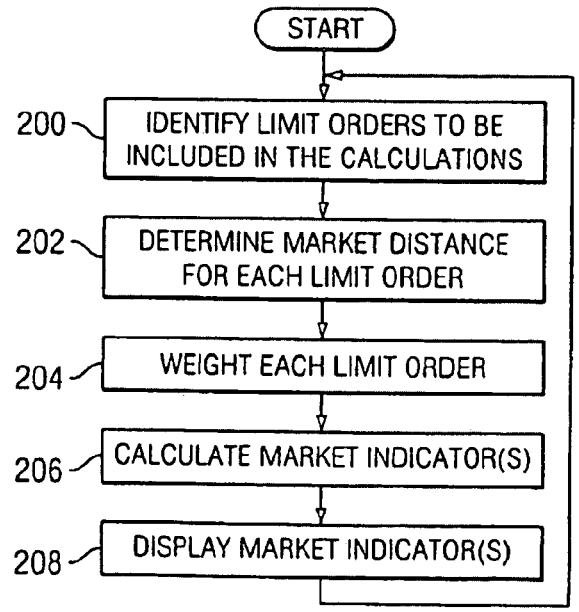
FIG. 4 illustrates a method of calculating and/or displaying one or more market indicators, according to certain embodiments of the invention.

FIG. 4 illustrates a general method of calculating and/or displaying one or more market indicators 42, according to certain embodiments of the invention. Such method may be periodically performed by trading order analysis module 26. In particular, the method discussed below may comprise the method for each periodic calculation, which may be repeated at each time period. At step 200, a subset of limit orders 22 to be included in the periodic calculation is identified. Trading order analysis module 26 may identify such subset of limit orders 22 according to any suitable rules or criteria, such as one or more rules or criteria pre-selected by a trader 18, for example. In some embodiments, all limit orders 22 currently on the exchange may be included in the analysis. In other embodiments, a portion of the limit orders 22 currently on the exchange may be excluded from the analysis. For example, limit orders 22 outside of a predetermined market distance (i.e., significant outliers) may be excluded from the analysis. Such predetermined market distance may be determined by trading order analysis module 26 or selected by a trader 18 or other user.

At step 202, a market distance for each of the limit orders 22 included in the analysis may be determined. As discussed above, the market distance of each limit order 22 may be the difference between the price of that limit order 22 and a market price, which may be the price of the best bid or the best offer on the exchange or the price of one or more recently executed trades, for example.

At step 204, each of the limit orders 22 included in the analysis may be weighted based at least on the determined market distance for that limit order 22. In certain embodiments, the smaller the market distance of a limit order 22, the greater the weight applied to that limit order 22, and vice versa. Various weighting systems are discussed in greater detail below.

At step 206, one or more market indicators 42 are calculated based at least on the weighting of each of the limit orders 22 included in the analysis. In certain embodiments or for calculating certain market indicators 42, the weighting is applied to the volume, or size, of the limit orders 22. For example, the volume of each limit order 22 may be multiplied by the weight determined for that limit order 22, and the resulting weighted order volumes may be used in the calculations of one or more market indicators 42. In other embodiments or for other calculating market indicators 42, the weighting is applied to the number of limit orders 22 or traders 18 having limit orders 22 at each price level or market distance. In other words, the weighting may be applied to the density of limit orders 22 at different price levels or market distances. Each limit order 22 at a particular price or market distance may have the same weighted value for purposes of calculating certain market indicators 42. For example, the number of limit orders 22 at each particular price level or market distance may be multiplied by the weight determined for that price level or market distance, and the resulting weighted numbers may be used in the calculations of one or more market indicators 42. In other embodiments or for other calculating market indicators 42, both the volume, or size, of each limit order and the number of limit orders 22 at each price level or market distance may be weighted and used for calculating certain market indicators 42. Thus, such market indicators 42 may depend on a combination of (a) the number, or density, of limit orders at each price level or market distance, and (b) the volume, or size, of each limit order 22.

Example market indicators 42 may include one or more of the following: (a) a total bid score, (b) a total bid score moving average, (c) a total offer score, (d) a total offer score moving average, (e) a net market score, and/or (f) a net market score moving average. The net market score may provide an indication of whether their is a net selling pressure or a net buying pressure in the relevant market, as well as the magnitude of such selling or buying pressure. Example algorithms for calculating such market indicators 42 are discussed below in the section entitled "Calculating Market Indicators."

At step 208, one or more of the market indicators 42 may be displayed to the trader 18, such as using graphical user interface 38. Such market indicators 42 may or may not be displayed in connection with plot 40 or another similar display of the limit order book. Steps 200 through 208 may be periodically repeated at each time interval such that the one or more market indicators 42 may be periodically updated to reflect the current state of the market.

Weighting of Limit Orders

At discussed above, each limit order 22 included in limit order book analysis may be weighted based at least on the determined market distance for that limit order 22. In some embodiments, the weighting system includes an algorithm for weighting each limit order 22 based on the market distance. For example, each limit order 22 may be weighted based on one of following equations or variations thereof:

$$\text{Weight} = C1 * C2^{-(C3*MD)} \quad (1)$$

$$\text{Weight} = C1 * MD^{-C2} \quad (2)$$

$$\text{Weight} = -C1 * \ln(MD) + C2 \quad (3)$$

$$\text{Weight} = C1 * MD \quad (4)$$

wherein MD is the market distance for the relevant limit order 22, and C1, C2 and C3 are any suitable constants (including 0 or 1).

Figures 5, 6:
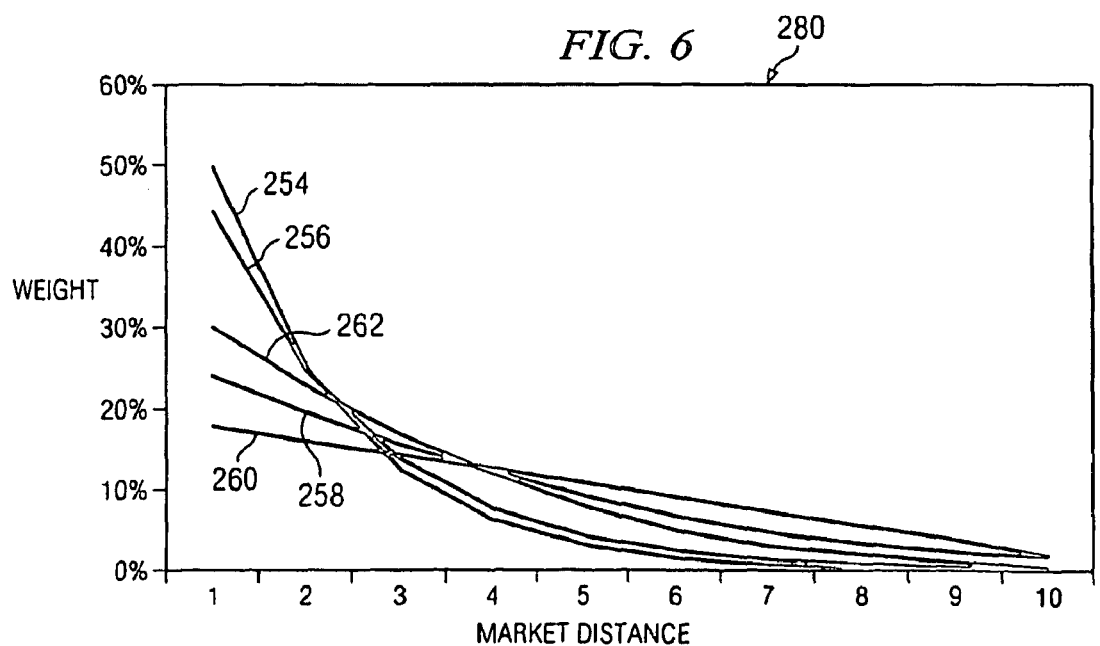
FIG. 5 illustrates an example table illustrating several example sets of weights for limit orders at ten different market distances, according to particular embodiments of the invention.
FIG. 6 illustrates a chart indicating each of the example sets of weights included in the table shown in FIG. 5.

In other embodiments, the weighting system includes a predetermined weight for each of a plurality of market distances. FIG. 5 illustrates a table 250 illustrating several example sets of weights for limit orders 22 at ten different market distances. Column 252 indicates the market distance, wherein "1" is the shortest market distance and "10" is the greatest market distance included in the analysis. Columns 254, 256, 258, 260, and 262 indicate the relative weighting for limit orders 22 at each of the ten market distances. FIG. 6 illustrates a chart 280 indicating each of the example sets of weights shown in columns 254-262 of table 250 of FIG. 3. As shown in FIG. 6, each of the three example sets of weights increase exponentially with decreasing market distance.

The weighting system, or at least parameters of the weighting system, may be determined by trading order analysis module 26 and/or selected by a trader 18 or other user. For example, in some embodiments, the trader 18 or other user may be provided an interface to select a particular weighting algorithm (such as one of algorithms 1-4 shown above, for example), select constants for such an algorithm, or select a particular set of weights (such as one of the sets of weights shown in columns 254-262 of table 250 of FIG. 5, for example). Thus, the trader 18 may configure various aspects of the weighting system as desired.

Calculating Market Indicators

In certain embodiments, the following algorithm, or variations of such algorithms may be used to determine one or more of the following market indicators 42: (a) a total bid score, (b) a total bid score moving average, (c) a total offer score, (d) a total offer score moving average, (e) a net market score, and/or (f) a net market score moving average.

The total bid score may provide a measure of the overall buying pressure in the market for the relevant product. In some embodiments, the total bid score may be equal to the total sum of all weighted bids in the analysis, wherein each weighted bid is equal to the bid price for each bid multiplied by the weighting for that bid. Thus, the total bid score may be represented as:

$$\text{Total bid score} = \Sigma(\text{bid price} * \text{weighting}) \quad (5)$$

In other embodiments, the total bid score may be equal to the total sum of the weighted bid densities at each price level or market distance included in the analysis, wherein the bid density for a particular price level or market distance is equal to either (a) the number of bids (or different traders 18 having existing bids) at that particular price level or market distance multiplied by the weighting for that particular price level or market distance or (b) the volume, or size, of bids at that particular price level or market distance multiplied by the weighting for that particular price level or market distance. Thus, the total bid score may be represented as:

$$\text{Total bid score} = (\text{number of bids at market distance} * \text{weighting for that market distance}) \quad (6a)$$

or $$\text{Total bid score} = (\text{volume of bids at market distance} * \text{weighting for that market distance}) \quad (6b)$$

Similarly, the total offer score may provide a measure of the overall selling pressure in the market for the relevant product. In some embodiments, the total offer score may be equal to the total sum of all weighted offers in the analysis, wherein each weighted offer is equal to the offer price for each offer multiplied by the weighting for that offer. Thus, the total offer score may be represented as:

$$\text{Total offer score} = \Sigma(\text{offer price} * \text{weighting}) \quad (7)$$

In other embodiments, the total offer score may be equal to the total sum of the weighted offer densities at each price level or market distance included in the analysis, wherein the offer density for a particular price level or market distance is equal to either (a) the number of offers (or different traders 18 having existing offers) at that particular price level or market distance multiplied by the weighting for that particular price level or market distance, or (b) the volume, or size, of offers (or different traders 18 having existing offers) at that particular price level or market distance multiplied by the weighting for that particular price level or market distance. Thus, the total offer score may be represented as:

$$\text{Total offer score} = \Sigma(\text{number of offers at market distance} * \text{weighting for that market distance}) \quad (8a)$$

or $$\text{Total offer score} = \Sigma(\text{volume of offers at market distance} * \text{weighting for that market distance}) \quad (8b)$$

The total bid score moving average may provide a measure of the overall buying pressure in the market for the relevant product that captures a larger period of time than an individual total bid score, which may be desirable in some instances. In some embodiments, the total bid score moving average may be the average of any particular number of periodically calculated total bid scores, which may be represented as:

$$\text{Total bid score moving average} = (\text{sum of total bid scores})/(\text{number of total bid scores}) \quad (9)$$

Similarly, the total offer score moving average may provide a measure of the overall buying pressure in the market for the relevant product that captures a larger period of time than an individual total offer score, which may be desirable in some instances. In some embodiments, the total offer score moving average may be the average of any particular number of periodically calculated total offer scores, which may be represented as:

$$\text{Total offer score moving average} = (\text{sum of total offer scores})/(\text{number of total offer scores}) \quad (10)$$

As discussed above, the net market score may provide an indication of whether their is a net selling pressure or a net buying pressure in the relevant market, as well as the magnitude of such selling or buying pressure. In some embodiments, the net market score may be equal to the difference of the total bid score and the total offer score, which may be represented as:

$$\text{Net market score} = \text{total bid score} - \text{total offer score} \quad (11)$$

or $$\text{Net market score} = \text{total offer score} - \text{total bid score} \quad (12)$$

The met market score moving average may provide a measure of the overall net market pressure that captures a larger period of time than an individual net market score, which may be desirable in some instances. In some embodiments, the net market score moving average may be the average of any particular number of periodically calculated net market scores, which may be represented as:

$$\text{Net market score moving average} = (\text{sum of net market scores})/(\text{number of net market scores}) \quad (13)$$

Modifications or variations may be made to any of the algorithms discussed above, such as any of Equations 1-13, without departing from the scope of the invention. In addition, modifications, additions, or omissions may be made to any of the methods discussed above, such as the methods discussed above with reference to FIGS. 3 and 4, without departing from the scope of the invention. Additionally, any of the steps of such methods may be performed in any suitable order, or simultaneously or non-simultaneously, without departing from the scope of the invention.

Accounting for Hidden Order Size

In some markets, the displayed size of a trading order 20 may not represent the actual size of the order. For example, a trader 18 may request that the displayed size for a particular trading order 20 may be less than the full size of the order, such that the full size of the order 20 is hidden from other market participants. The portion of the order 20 that is not displayed to the market may be referred to as the "hidden order size."

Because the calculation of one or more market indicators 42 may depend on the displayed volume, or size, of one or more orders 20 (such as shown in Equations 6b and 8b for example), such hidden order size for such orders 20 may affect the accuracy of such calculations. In other words, hidden order size for orders 20 may affect the extent to which particular market indicators 42 are accurate indications of the state of the market. Thus, in some embodiments, trading order analysis module 26 may account for, or attempt to account for, hidden order size of orders 20 used in the calculation of market indicators 42.

For example, in some embodiments, trading order analysis module 26 may estimate a hidden order size for various displayed orders 20 having an unknown hidden order size based on the known hidden order size of one or more other orders 20, such as one or more recently traded orders 20. Trading order analysis module 26 may become aware of the actual size of trading orders 20, including any hidden order size, when trading orders 20 are traded or enter into a trading state. Thus, trading order analysis module 26 may receive information identifying the hidden order size for trading orders 20 that have traded or entered into a trading state, and use such information to estimate a hidden order size for displayed orders 20 still on the exchange, each of which may or may not have an unknown hidden order size. Trading order analysis module 26 may then adjust the volume, or size, of some or all of such displayed trading orders 20 for the purposes of calculating particular market indicators 42. For example, in certain embodiments, trading order analysis module 26 may determine relationships between the displayed size and the hidden order size for one or more trading orders 20 that have traded or entered into a trading state. Trading order analysis module 26 may then use such determined relationships to adjust the volume, or size, of some or all of such displayed trading orders 20 for the purposes of calculating particular market indicators 42. The volume, or size, of particular displayed trading orders 20 may be adjusted on an individual basis or on a group basis. For example, the volume or individual trading orders 20 may be adjusted based on any number of parameters, such as the displayed size of the order 20, the type of order 20 (e.g., particular types of orders 20 may be determined to be statistically associated with particular hidden order sizes, the trader 18 from which the order 20 was received (e.g., particular traders 18 may be determined to be statistically associated with particular hidden order sizes), and whether the order 20 is a buy or sell order, the displayed size of the order 20, for example.

Although an embodiment of the invention and its advantages are described in detail, a person skilled in the art could make various alterations, additions, and omissions without departing from the spirit and scope of the present invention as defined by the appended claims.

What is claimed is:
1. An apparatus comprising:
a processor; and
a memory electronically coupled to the processor that stores instructions which, when executed by the processor, direct the processor to:
receive data regarding a plurality of limit orders entered onto an electronic market, the data regarding each limit order comprising a respective price and a respective time associated with the respective limit order;
record the received data for each of the plurality of limit orders; and
periodically calculate one or more market indicators regarding the state of the electronic market, in which each periodic calculation comprises:
determining a subset of the plurality of limit orders for the respective periodic calculation;
determining a market distance for each limit order of the subset, the market distance for each limit order comprising the difference between the price of the respective limit order and a market price;
determining a weighting for each limit order of the subset based at least on the determined market distance for the respective limit order; and
calculating the one or more market indicators based at least on the weighting of each limit order of the subset; and
causing the one or more periodically calculated market indicators to be displayed in a graphical user interface.

2. The apparatus of claim 1, in which the act of determining the subset of limit orders for each periodic calculation comprises:
determining a plurality of the limit orders currently on the electronic market at the time of the respective periodic calculation, in which the subset of limit orders currently on the electronic market changes between at least a portion of the periodic calculations.

3. The apparatus of claim 1, in which determining the subset of limit orders for each periodic calculation comprises determining in the subset only limit orders having a price within a particular market distance.

4. The apparatus of claim 1, in which:
the act of determining the subset of limit orders for each periodic calculation comprises determining the subset of limit orders having a price that is within a particular market distance; and
in which the instructions, when executed by the processor, further direct the processor to receive from a user a selection the particular market distance.

5. The apparatus of claim 1, in which the act of periodically calculating one or more market indicators comprises:
periodically updating the one or more market indicators based on changes in the subset of limit orders currently on the electronic market.

6. The apparatus of claim 1, in which:
each limit order is associated with a respective size; and
the act of calculating the one or more market indicators comprises multiplying the weighting for each limit order of the subset with the size associated with the respective limit order.

7. The apparatus of claim 1, in which each limit order comprises a respective size, and in which the instructions, when executed by the processor, further direct the processor to:
determine the number of limit orders at each of a plurality of prices; and
in which the act of calculating the one or more market indicators comprises, for each of the plurality of prices, multiplying the number of limit orders at the respective price with the weighting for one of the limit orders at the price.

8. The apparatus of claim 1, in which each limit order comprises a respective size and is associated with a trading entity, and in which the instructions, when executed by the processor, further direct the processor to:
determine a number of different trading entities associated with one or more limit orders at each of a plurality of prices;
in which the act of calculating the one or more market indicators comprises, for each of the plurality of prices, multiplying the number of different trading entities associated with one or more limit orders at the respective price with the weighting for one of the limit orders at the price.

9. The apparatus of claim 1, in which each periodic calculation of the one or more market indicators comprises:
determining a subset of limit orders for the respective periodic calculation including one or more bids and one or more offers, each bid and each offer comprising a size;
for each of the one or more bids, multiplying the weighting for that bid with the size of that bid to determine a weighted bid score for that bid;
summing the weighted bid scores for the one or more bids to determine a total bid score;
for each of the one or more offers, multiplying the weighting for that offer with the size of that offer to determine a weighted offer score for that offer;
summing the weighted offer scores for the one or more offers to determine a total offer score; and
calculating the difference between the total bid score and the total offer score to determine a net market score.

10. The apparatus of claim 9, in which the act of causing the one or more periodically calculated market indicators to be displayed comprises:
causing the net market score to be displayed in the graphical user interface.

11. The apparatus of claim 9, in which the instructions, when executed by the processor, further direct the processor to:
calculate a net market score moving average by calculating a moving average of a predetermined number of periodically calculated net market scores for the electronic market; and
cause the net market score moving average to be displayed.

12. The apparatus of claim 9, in which the act of causing the one or more periodically calculated market indicators to be displayed comprises:
causing at least one of the total bid score and the total offer score to be displayed in the graphical user interface.

13. The apparatus of claim 9, in which the instructions, when executed by the processor, further direct the processor to:
calculate a total bid score moving average by calculating a moving average of a predetermined number of periodically calculated total bid scores;
calculate a total offer score moving average by calculating a moving average of a predetermined number of periodically calculated total offer scores; and
cause at least one of the total bid score moving average and the total offer score moving average to be displayed at the graphical user interface.

14. The apparatus of claim 1, in which periodically calculating the one or more market indicators comprises periodically updating the one or more market indicators substantially in real time.

15. The apparatus of claim 1, in which the act of determining a weighting for each limit order of the subset based at least on the determined market distance for the respective limit order comprises determining the weighting using a weighting system in which market distance and weight are related exponentially.

16. The apparatus of claim 1, in which the act of determining a weighting for each limit order of the subset based at least on the determined market distance for the respective limit order comprises determining the weighting using a weighting system in which market distance and weight are inversely related.

17. The apparatus of claim 1, in which the act of determining a weighting for each limit order of the subset comprises determining the weighting based on a plurality of weights, and in which the instructions, when executed by the processor, further direct the processor to:
receive from a user a selection of one or more of the plurality of weights.

18. The apparatus of claim 1, in which:
the plurality of limit orders comprises one or more bids and one or more offers;
the market price for a bid order is the price of the best bid currently on the electronic market; and
the market price for a sell order is the price of the best offer currently on the electronic market.

19. The apparatus of claim 1, in which the market price is based on one or more recent trades between limit orders on the electronic market.

20. The apparatus of claim 1, in which the market price changes substantially in real time.

21. The apparatus of claim 1, in which each limit order has an associated displayed size, and in which the instructions, when executed by the processor, further direct the processor to:
determine a hidden size for one or more particular limit orders;
determine a relationship between the displayed size and the hidden size for the one or more particular limit orders; and
adjust the displayed size of at least a portion of the limit orders on the electronic market based on the determined relationship between the displayed size and the hidden size for the one or more particular limit orders.

22. The apparatus of claim 1, in which the act of determining a market distance for each limit order of the subset, the market distance for each limit order comprising a difference between the price of the respective limit order and a market price comprises:
determining a market distance for each limit order of the subset, the market distance for each limit order comprising a difference between the price of the respective limit order and a market price determined based on at least one of the price of a highest bid, the price of a lowest offer, and a price of one or more recently executed trades.

23. The apparatus of claim 1, in which the instructions, when executed by the processor, further direct the processor to:
receive data regarding a plurality of limit orders entered onto an electronic market in substantially real time, the data regarding each limit order including a price and a time associated with the respective limit order, the plurality of limit orders comprising the subset of limit orders, the plurality of limit orders comprising a plurality of bids, a plurality of offers, a plurality of buy orders, and a plurality of sell orders, each buy order comprising a bid that aggresses on an existing offer to initiate a trade and each sell order comprising an offer that aggresses on an existing bid to initiate a trade;
based on the received data, generate a graphical display comprising an icon associated with each of the plurality of limit orders, the graphical display indicating, for each of the plurality of limit orders entered onto the electronic market within a period of time, the price and the time associated with the respective limit order, wherein the price associated with each limit order is indicated by a first axis of the graphical display and the time associated with each limit order is indicated by a second axis of the graphical display, the graphical display further indicating the market distance of at least a portion of the plurality of limit orders order by at least one of the shape, size, color, brightness, transparency, opaqueness, and flashing of an icon corresponding to the respective limit order; and
display the graphical display at an electronic display device, in which the graphical display indicates each bid using a first type of identifier, each offer using a second type of identifier, each buy order using a third type of identifier, and each sell order using a fourth type of identifier, wherein each of the first, second, third and fourth types of identifiers are visually distinct from each other.

24. A method comprising:
receiving data regarding a plurality of limit orders entered onto an electronic market, the data regarding each limit order comprising a respective price and a respective time associated with the respective limit order;
recording the received data for each of the plurality of limit orders;
periodically calculating by a processor one or more market indicators regarding the state of the electronic market, the one or more market indicators comprising a net market score, each periodic calculation including:
determining by the processor a subset of the plurality of limit orders for the respective periodic calculation, the subset comprising one or more bids and one or more offers, each bid and each offer comprising a respective size, in which the subset of limit orders currently on the electronic market changes between at least a portion of the periodic calculations;
determining by the processor a market distance for each limit order of the subset, the market distance for each limit order comprising a difference between the price of the respective limit order and a market price;
determining by the processor a weighting for each limit order of the subset based at least on the determined market distance for the respective limit order; and
calculating by the processor the one or more market indicators based at least on the weighting of each limit order of the subset, in which the act of calculating the one or more market indicators comprises:
for each of the one or more bids, multiplying the weighting for the respective bid with the size of the bid to determine a weighted bid score for the bid;
summing the weighted bid scores for the one or more bids to determine a total bid score;
for each of the one or more offers, multiplying the weighting for the respective offer with the size of the offer to determine a weighted offer score for the offer;
summing the weighted offer scores for the one or more offers to determine a total offer score; and
calculating the difference between the total bid score and the total offer score to determine the net market score;

causing the net market score to be displayed at an electronic display device; and
periodically updating the one or more market indicators substantially in real time based on changes in the subset of limit orders currently on the electronic market.

25. The method of claim 24, further comprising:
calculating a total bid score moving average by calculating a moving average of a predetermined number of periodically calculated total bid scores;
calculating a total offer score moving average by calculating a moving average of a predetermined number of periodically calculated total offer scores; and
displaying at least one of the total bid score moving average and the total offer score moving average in the graphical user interface.

26. The method of claim 24, in which each limit order has an associated displayed size, further comprising:
determining a hidden size for one or more particular limit orders;
determining a relationship between the displayed size and the hidden size for the one or more particular limit orders; and
adjusting the displayed size of at least a portion of the limit orders on the electronic market based on the determined relationship between the displayed size and the hidden size for the one or more particular limit orders.

27. A method comprising:
receiving, by at least one processor, data regarding a plurality of limit orders entered onto an electronic market, the data regarding each limit order comprising a respective price and a respective time associated with the respective limit order;
recording, by the at least one processor, the received data for each of the plurality of limit orders; and
periodically calculating, by the at least one processor, one or more market indicators regarding the state of the electronic market, in which each periodic calculation comprises:
determining a subset of the plurality of limit orders for the respective periodic calculation;
determining a market distance for each limit order of the subset, the market distance for each limit order comprising the difference between the price of the respective limit order and a market price;
determining a weighting for each limit order of the subset based at least on the determined market distance for the respective limit order; and
calculating the one or more market indicators based at least on the weighting of each limit order of the subset; and
causing, by the at least one processor, the one or more periodically calculated market indicators to be displayed in a graphical user interface in electronic communication with the processor.

28. The method of claim 27, in which the act of determining the subset of limit orders for each periodic calculation comprises:
determining a plurality of the limit orders currently on the electronic market at the time of the respective periodic calculation, in which the subset of limit orders currently on the electronic market changes between at least a portion of the periodic calculations.

29. The method of claim 27, in which determining the subset of limit orders for each periodic calculation comprises determining in the subset only limit orders having a price within a particular market distance.

30. The method of claim 27, in which the act of determining the subset of limit orders for each periodic calculation comprises determining the subset of limit orders having a price that is within a particular market distance, further comprising:
receiving from a user a selection the particular market distance.

31. The method of claim 27, in which the act of periodically calculating one or more market indicators comprises:
periodically updating the one or more market indicators based on changes in the subset of limit orders currently on the electronic market.

32. The method of claim 27, in which:
each limit order comprises a respective size; and
the act of calculating the one or more market indicators comprises multiplying the weighting for each limit order of the subset with the size of the respective limit order.

33. The method of claim 27, in which each limit order comprises a respective size, further comprising:
determining the number of limit orders at each of a plurality of prices; and
in which the act of calculating the one or more market indicators comprises, for each of the plurality of prices, multiplying the number of limit orders at the respective price with the weighting for one of the limit orders at the price.

34. The method of claim 27, in which each limit order comprises a respective size and is associated with a trading entity, further comprising:
determining a number of different trading entities associated with one or more limit orders at each of a plurality of prices;
in which the act of calculating the one or more market indicators comprises, for each of the plurality of prices, multiplying the number of different trading entities associated with one or more limit orders at the respective price with the weighting for one of the limit orders at the price.

35. The method of claim 27, in which each periodic calculation of the one or more market indicators comprises:
determining a subset of limit orders for the respective periodic calculation including one or more bids and one or more offers, each bid and each offer comprising a size;
for each of the one or more bids, multiplying the weighting for that bid with the size of that bid to determine a weighted bid score for that bid;
summing the weighted bid scores for the one or more bids to determine a total bid score;
for each of the one or more offers, multiplying the weighting for that offer with the size of that offer to determine a weighted offer score for that offer;
summing the weighted offer scores for the one or more offers to determine a total offer score; and
calculating the difference between the total bid score and the total offer score to determine a net market score.

36. The method of claim 35, in which causing the one or more periodically calculated market indicators to be displayed comprises:
causing the net market score to be displayed in the graphical user interface.

37. The method of claim 35, further comprising:
calculating a net market score moving average by calculating a moving average of a predetermined number of periodically calculated net market scores for the electronic market; and
causing the net market score moving average to be displayed.

38. The method of claim 35, in which causing the one or more periodically calculated market indicators to be displayed comprises:
  causing at least one of the total bid score and the total offer score to be displayed in the graphical user interface.

39. The method of claim 35, further comprising:
  calculating a total bid score moving average by calculating a moving average of a predetermined number of periodically calculated total bid scores;
  calculating a total offer score moving average by calculating a moving average of a predetermined number of periodically calculated total offer scores; and
  causing at least one of the total bid score moving average and the total offer score moving average to be displayed in the graphical user interface.

40. The method of claim 27, in which periodically calculating the one or more market indicators comprises periodically updating the one or more market indicators substantially in real time.

41. The method of claim 27, in which the act of determining a weighting for each limit order of the subset based at least on the determined market distance for the respective limit order comprises determining the weighting using a weighting system in which market distance and weight are related exponentially.

42. The method of claim 27, in which the act of determining a weighting for each limit order of the subset based at least on the determined market distance for the respective limit order comprises determining the weighting using a weighting system in which market distance and weight are inversely related.

43. The method of claim 27, in which the act of determining a weighting for each limit order of the subset comprises determining the weighting based on a plurality of weights, further comprising:
  receiving from a user a selection of one or more of the plurality of weights.

44. The method of claim 27, in which:
  the plurality of limit orders comprises one or more bids and one or more offers;
  the market price for a bid order is the price of the best bid currently on the electronic market; and
  the market price for a sell order is the price of the best offer currently on the electronic market.

45. The method of claim 27, in which the market price is based on one or more recent trades between limit orders on the electronic market.

46. The method of claim 27, in which the market price changes substantially in real time.

47. The method of claim 27, in which each limit order has an associated displayed size, further comprising:
  determining a hidden size for one or more particular limit orders;
  determining a relationship between the displayed size and the hidden size for the one or more particular limit orders; and
  adjusting the displayed size of at least a portion of the limit orders on the electronic market based on the determined relationship between the displayed size and the hidden size for the one or more particular limit orders.

48. The method of claim 27, in which the act of determining a market distance for each limit order of the subset, the market distance for each limit order comprising a difference between the price of the respective limit order and a market price comprises:
  determining a market distance for each limit order of the subset, the market distance for each limit order comprising a difference between the price of the respective limit order and a market price determined based on at least one of the price of a highest bid, the price of a lowest offer, and a price of one or more recently executed trades.

49. The method of claim 27, further comprising:
  receiving data regarding a plurality of limit orders entered onto an electronic market in substantially real time, the data regarding each limit order including a price and a time associated with the respective limit order, the plurality of limit orders comprising the subset of limit orders, the plurality of limit orders comprising a plurality of bids, a plurality of offers, a plurality of buy orders, and a plurality of sell orders, each buy order comprising a bid that aggresses on an existing offer to initiate a trade and each sell order comprising an offer that aggresses on an existing bid to initiate a trade;
  based on the received data, generating a graphical display comprising an icon associated with each of the plurality of limit orders, the graphical display indicating, for each of the plurality of limit orders entered onto the electronic market within a period of time, the price and the time associated with the respective limit order, wherein the price associated with each limit order is indicated by a first axis of the graphical display and the time associated with each limit order is indicated by a second axis of the graphical display, the graphical display further indicating the market distance of at least a portion of the plurality of limit orders order by at least one of the shape, size, color, brightness, transparency, opaqueness, and flashing of an icon corresponding to the respective limit order; and
  displaying the graphical display at an electronic display device, in which the graphical display indicates each bid using a first type of identifier, each offer using a second type of identifier, each buy order using a third type of identifier, and each sell order using a fourth type of identifier, wherein each of the first, second, third and fourth types of identifiers are visually distinct from each other.

\* \* \* \* \*